(12) United States Patent
Sharma (10) Patent No.: US 8,300,884 B2
(45) Date of Patent: Oct. 30, 2012

(54) COMBINED WATERMARKING AND FINGERPRINTING

(75) Inventor: Ravi K. Sharma, Hillsboro, OR (US)

(73) Assignee: Digimarc Corporation, Beaverton, OR (US)

( * ) Notice: Subject to any disclaimer, the term of this patent is extended or adjusted under 35 U.S.C. 154(b) by 331 days.

(21) Appl. No.: 12/785,290

(22) Filed: May 21, 2010

(65) Prior Publication Data
US 2010/0322469 A1   Dec. 23, 2010

Related U.S. Application Data

(60) Provisional application No. 61/180,415, filed on May 21, 2009.

(51) Int. Cl.
G06K 9/00 (2006.01)
H04L 9/32 (2006.01)
(52) U.S. Cl. .......... 382/100; 382/275; 713/176
(58) Field of Classification Search .......... 382/100, 382/115–116, 119, 124, 137, 168, 173, 181, 382/188, 232, 233, 254, 274, 275, 276, 290–294, 382/305, 312; 713/155; 725/22; 704/200
See application file for complete search history.

(56) References Cited

U.S. PATENT DOCUMENTS

| | | | |
|---|---|---|---|
| 4,230,990 A * | 10/1980 | Lert et al. | 725/22 |
| 5,210,820 A * | 5/1993 | Kenyon | 704/200 |
| 6,122,403 A * | 9/2000 | Rhoads | 382/233 |
| 6,614,914 B1 | 9/2003 | Rhoads et al. | |
| 6,674,876 B1 * | 1/2004 | Hannigan et al. | 382/100 |
| 6,711,293 B1 | 3/2004 | Lowe | |
| 6,990,453 B2 | 1/2006 | Wang et al. | |
| 7,168,083 B2 | 1/2007 | Kalker et al. | |
| 7,174,293 B2 | 2/2007 | Kenyon et al. | |
| 7,289,643 B2 | 10/2007 | Brunk et al. | |
| 7,346,512 B2 | 3/2008 | Li-Chun Wang et al. | |
| 7,412,072 B2 | 8/2008 | Sharma et al. | |
| 7,519,819 B2 | 4/2009 | Bradley et al. | |
| 8,171,030 B2 | 5/2012 | Pereira et al. | |
| 2002/0159614 A1 | 10/2002 | Bradley et al. | |
| 2002/0178410 A1 | 11/2002 | Haitsma et al. | |
| 2006/0031684 A1 | 2/2006 | Sharma et al. | |
| 2006/0177096 A1 | 8/2006 | Malik et al. | |
| 2006/0239502 A1 | 10/2006 | Petrovic et al. | |
| 2006/0280246 A1 | 12/2006 | Alattar et al. | |
| 2007/0220265 A1 | 9/2007 | Lemma et al. | |
| 2008/0154401 A1 | 6/2008 | Wang | |
| 2008/0174570 A1 | 7/2008 | Jobs et al. | |
| 2008/0250240 A1 * | 10/2008 | Celik et al. | 713/155 |
| 2009/0022360 A1 * | 1/2009 | Bradley et al. | 382/100 |

OTHER PUBLICATIONS

PCT/US10/035834 Search Report and Written Opinion dated May 21, 2009.
Bhat, D. N. and Nayar, S. K., "Ordinal measures for image correspondence," IEEE Trans. Pattern Ana. mach. Intell., vol. 20, No. 4, pp. 415-423, Apr. 1998.

(Continued)

*Primary Examiner* — Seyed Azarian
(74) *Attorney, Agent, or Firm* — Digimarc Corporation (57) ABSTRACT

Content fingerprints and watermarks are combined in various ways for content identification applications. Fingerprints are used to identify content generally while watermarks provide more detailed localization of parts within the content, and vice versa. Fingerprint techniques are further used for signal synchronization and other pre-processing steps to assist in digital watermark decoding. A variety of fingerprint/watermark techniques identify characteristics of the channel of content from content samples.

24 Claims, 2 Drawing Sheets

OTHER PUBLICATIONS

Mohan, R., "Video sequence matching,"Proc. Int. Conf. Acoust., Speech and Signal Processing (ICASSP), vol. 6, pp. 3697-3700, Jan. 1998.

Oostveen, J., Kalker, T. and Haitsma, J., "Feature extraction and a database strategy for video fingerprinting," Proc. 5th Int. Conf. Recent Advance in Visual Information Systems, pp. 117-128, 2002.

Kim C. and Vasudev B., "Spatiotemporal sequence matching for efficient video copy detection," IEEE Trans. Circuits Syst. Video Technol., vol. 15, No. 1, pp. 127-132, Jan. 2005.

Lu J., "Video fingerprinting for copy identification: from research to industry applications", Proceedings of SPIE, Media Forensics and Security, vol. 7254, Feb. 2009.

Lowe, "Distinctive Image Features from Scale-Invariant Keypoints," International Journal of Computer Vision, 60, 2 (2004), pp. 91-110.

Lowe, "Object Recognition from Local Scale-Invariant Features," International Conferenceon Computer Vision, Corfu, Greece (Sep. 1999), pp. 1150-1157.

Bonato et al, "Parallel Hardware Architecture for Scale and Rotation Invariant Feature Detection," IEEE Tran on Circuits and Systems for Video Tech, vol. 18, No. 12, 2008.

Se et al, "Vision Based Modeling and Localization for Planetary Exploration Rovers," Proc. of Int. Astronautical Congress (IAC), Oct. 2004.

Mikolajczyk et al, "Performance Evaluation of Local Descriptors," IEEE Trans. Pattern Anal. Mach. Intell., vol. 27, No. 10, pp. 1516-1630, 2005.

Bay et al. "SURF: Speeded Up Robust Features," Eur. Conf. on Computer Vision (1), pp. 404-417, 2006.

Chen et al, "Efficient Extraction at Robust linage Features on Mobile Devices," Proc. of the $6^{th}$ IEEE and ACM Int. Symp. On Mixed and Augmented Reality, 2007.

Takacs et al, "Outdoors Augmented Reality on Mobile Phone Using Loxel-Based Visual Feature Organization," ACM Int. Conf. on Multimedia Information Retrieval, Oct. 2008.

L.G. Brown, "A survey of image registration techniques", ACM. Comptiling Surveys 24 (1992) 326-376.

I. J. Cox, M. L. Miller, and J. A, Bloom, "Digital waterinarking," Chapter 5—Watermarking with Side Information, *Morgan Kaufmann*, 2001.

* cited by examiner

COMBINED WATERMARKING AND FINGERPRINTING

RELATED APPLICATION DATA

This application claims benefit of U.S. Provisional Application 61/180,415, filed May 21, 2009.

TECHNICAL FIELD

The invention relates to signal processing generally, and multimedia signal processing more specifically, including steganography, digital watermarking, content signal identification, recognition, classification and database searching and retrieval based on content signal attributes.

BACKGROUND AND SUMMARY

In some applications such as monitoring and tracking of video and audio content distribution (e.g., broadcast, Internet, etc.), it is desirable to identify different parts of the media with a fine granularity. Granularity refers to the smallest unit of time (or portion) of the media signal which can be reliably identified. For example, this might be a particular point in a TV show, advertisement, movie or song.

Consider a video signal with an embedded watermark. Assume that the same watermark payload is repeatedly embedded in each frame of the video. Under noisy conditions (compression, D/A/D conversions etc.), the watermark detection process can aggregate the watermark signal across several frames since the payload is identical. Aggregation improves the signal-to-noise ratio and provides improved robustness. However, in this example, the watermark signal does not provide the ability to distinguish between different portions of the video signal.

Now consider a video signal with a unique watermark payload embedded in each frame of the video. In this case, the watermark signal provides fine granularity—the ability to identify each individual frame of the video signal. However, under noisy conditions, the watermark robustness would drop since the unique payload does not necessarily allow aggregation of the watermark signal.

A similar issue exists in fingerprinting systems where granularity is achieved by extracting a unique fingerprint for each portion of the media signal. The finer the granularity, the larger the number of fingerprints and larger is the size of the fingerprint database. Increasing the size of the fingerprint database increases the computational cost (and system cost) of the fingerprint search and matching process.

Watermarks provide the ability to serialize media content, i.e., identical copies of the same media signal can be embedded with distinct watermark payloads, whereas fingerprinting cannot distinguish between identical copies. Watermarking involves introducing changes to the media signal and raises the question of perceptibility of the watermark signal. On the other hand, fingerprinting does not involve any change to the media signal.

A combination of watermarking and fingerprinting can address the issues of granularity, robustness and perceptibility, and can allow greater latitude in the design of content identification systems. Combination approaches that take advantage of the complementary strengths of watermarking and fingerprinting are described below.

Combinations of watermarks and fingerprints for content identification and related applications are described in assignees U.S. Patent Publication 20060031684, which is hereby incorporated by reference. Watermarking, fingerprinting and content recognition technologies are also described in assignee's U.S. Patent Publication 20060280246 and U.S. Pat. Nos. 6,122,403, 7,289,643 and 6,614,914, which are hereby incorporated by reference.

Additional examples of audio and/or video recognition are described in U.S. Pat. Nos. 7,174,293, 7,346,512, 6,990,453 and U.S. Patent Publication 20020178410, which are hereby incorporated by reference. For the purposes of this disclosure, these patent documents provide a description of fingerprint technologies that can be combined with watermarking technologies as explained further below.

For additional examples of video recognition techniques. See, e.g., Bhat, D. N. and Nayar, S. K., "Ordinal measures for image correspondence," IEEE Trans. Pattern Ana. Mach. Intell., vol. 20, no. 4, pp. 415-423, April 1998. Mohan, R., "Video sequence matching," Proc. Int. Conf. Acoust., Speech and Signal Processing (ICASSP), vol. 6, pp. 3697-3700, January 1998. Oostveen, J., Kalker, T. and Haitsma, J., "Feature extraction and a database strategy for video fingerprinting," Proc. 5th Int. Conf. Recent Advance in Visual Information Systems, pp. 117-128, 2002. Kim, C. and Vasudev B., "Spatiotemporal sequence matching for efficient video copy detection," IEEE Trans. Circuits Syst. Video Technol., vol. 15, no. 1, pp. 127-132, January 2005. Lu, J., "Video fingerprinting for copy identification: from research to industry applications", Proceedings of SPIE, Media Forensics and Security, Vol. 7254, February 2009.

DETAILED DESCRIPTION 1.1 Using Watermarking to Reduce Search Space for Fingerprint Matching Kalker and Oostveen (Kalker, A., Oostveen, J., U.S. Pat. No. 7,168,083, Jan. 23, 2007) describe a scheme where a watermark is embedded in media signals with the payload representing an index in a fingerprint database. They contemplate a relatively small payload that conveys information about the section of the database within which the media content is to be searched. On detection of the watermark, the payload can be used as an index to limit the database search needed for searching and matching with the fingerprint database.

1.2 Identification Using Watermarking, Localization Using Fingerprinting

This scheme discussed in Section 1.1 can be further extended to encode the embedded watermark with a full payload that conveys all pertinent identification information about the media signal. Rather than identify a section of the database, the payload can then identify the specific media signal itself. In addition, the payload may also include serialization information which allows otherwise identical copies of the media signal to be uniquely identified (say for the purposes of tracking distribution or usage). The task of this watermark is to reliably and robustly identify the video. The signal-to-noise ratio of the watermark signal can be improved by repeatedly embedding the same watermark payload throughout the media signal. This approach also allows the strength of the watermark signal in any particular region of the media signal to be adapted such that the watermark signal is imperceptible. During detection, the watermark signal components are then aggregated across different regions or time segments of the media signal to provide sufficient robustness. In this approach, the watermark cannot provide localization information (i.e., which part of the media signal the watermark was detected from). Localization can be provided by fingerprinting. As in the approach of Kalker and Oostveen (Kalker, A., Oostveen, J., U.S. Pat. No. 7,168,083, Jan. 23, 2007), the watermark payload is used as an index to identify the fingerprints associated with the media signal in the fingerprint database. This step reduces the database search (thereby keeping system costs low). Matching the extracted fingerprints with those of the identified media signal in the database can then provide localization information.

1.2 Identification Using Fingerprinting, Localization Using Watermarking

Contrary to the approach outlined in Section 1.2, content identification can be carried out using fingerprinting while localization can be achieved through watermarking. A content identification application may require the identification to be carried out with extremely fine granularity. For example, assume that every frame of a video sequence must be uniquely identified. Using fingerprinting techniques to identify each and every frame uniquely is impractical, as the corresponding fingerprint database will be massive and searching through this database would be computationally expensive. Instead, identification can initially be achieved using fingerprinting techniques. Localization can then be achieved using watermarking techniques. For instance, a unique watermark payload could be embedded in each frame of the video. This payload would pinpoint the location of the frame within the video, but would not be able to identify the video itself. For example, the watermark payload could consist of a time code, which changes every frame. Efficient encoding schemes for carrying the time codes within a watermark payload can then be taken advantage of to improve robustness of the watermark signal or reduce its strength. Such schemes are described in Section 4.

1.4 Use of Fingerprinting and Recognition Techniques for Providing Synchronization for Watermark Recovery Reading the watermark payload often requires synchronization of the contents of the media signal such that the media signal is reverted to the form when the watermark information bits were embedded. Usually, synchronization is achieved by embedding a separate synchronization signal. The constraints imposed by the imperceptibility requirements limit the strength of the watermark signal (and synchronization signal) that can be embedded. As a result, synchronization can only be achieved over a certain range of transformations to the media signal. Beyond this range synchronization is lost and the watermark payload is rendered unreadable.

If fingerprinting techniques can be employed to identify the media signal, the identified signal can be used to recover the synchronization signal. For example, the SIFT technique extracts a set of feature points from an image to recognize objects in the image by matching with corresponding images in a database. The SIFT technique can determine the geometric transformation applied to the image by comparing with the image in the database. Synchronization can be achieved with respect to the original media signal using the derived geometric information. This obviates the need for an explicit synchronization signal. The reading of the watermark payload often requires synchronization of the contents of the media signal such that it is reverted to the form when the watermark information bits were embedded. Often, synchronization is achieved by embedding a separate synchronization signal. If the content can be identified by fingerprinting, then the synchronization information could be recovered by comparing the original media and the transformed media. This approach can be used to extend the range of transformation under which the watermark can be recovered. For example, assume that the synchronization scheme for an image watermark is robust to a reduction in scale down to 50%. An image recognition technique could then be used for reductions smaller than 50%.

Alternatively, the use of fingerprinting or recognition techniques for synchronization may eliminate the need for an explicit synchronization signal for some applications. Elimination of the synchronization signal can reduce perceptibility of the watermark as well as to increase robustness.

SIFT Description

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are invariant to image scale, rotation and affine transformation. They are also robust to changes in illumination, noise, and some changes in viewpoint. In addition to these properties, they are distinctive, relatively easy to extract, allow for correct object identification with low probability of mismatch and are straightforward to match against a (large) database of local features. Object description by set of SIFT features is also robust to partial occlusion; as few as 3 SIFT features from an object can be enough to compute location and pose.

The technique starts by identifying local image features—termed keypoints—in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient are calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with σ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints at different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with a 1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25%—to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure, suitable for implementation in a next generation cell phone, is Bonato et al, "Parallel Hardware Architecture for Scale and Rotation Invariant Feature Detection," IEEE Trans on Circuits and Systems for Video Tech, Vol. 18, No. 12, 2008.

An alternative hardware architecture for executing SIFT techniques is detailed in Se et al, "Vision Based Modeling and Localization for Planetary Exploration Rovers," Proc. of Int. Astronautical Congress (IAC), October, 2004.

While SIFT is perhaps the most well known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005) and SURF (c.f., Bay et al, SURF: Speeded Up Robust Features," Eur. Conf. on Computer Vision (1), pp. 404-417, 2006; Chen et al, "Efficient Extraction of Robust Image Features on Mobile Devices," Proc. of the $6^{th}$ IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008).

1.5 Use of Fingerprinting and Recognition Techniques for Removal of Host Content The approach described in Section 1.4 can be extended further by using fingerprinting or recognition techniques to identify the content in the media signal sample, synchronize the media signal sample such that it is aligned with a reference copy stored in a database, and then remove (subtract out) the host content in the media signal sample using the reference signal such that just the watermark signal remains. Removal of the host information (original image) improves robustness by increasing the signal-to-noise ratio. Effectively, this approach turns watermark detection into a non-blind approach (i.e., informed detection). The watermark payload in this case can be used for conveying information bits such as for serialization or tracking.

2 Deriving Channel Characteristics from Media Signal Samples

Content identification is typically concerned with identifying a sample of a media signal. Content identification techniques are usually designed to disregard (or even overcome) the transformations that the media signal sample may have undergone. In some applications, though, it may be useful to determine the nature of the transformations that the media signal has undergone. For instance, is the sample a low resolution video, high definition video or has the content in the signal been subject to resizing (scaling) or rotation? In other applications, it may be necessary to determine the distribution path of the sample. For example, was the video a mobile version of the original media, or was it a broadcast version?

The information carrying capability provided by watermarking can be used to encode the distribution path in the watermark payload. Also, in the case of video signals, the watermark can be embedded in both the audio and video portions of the signal. Transformations where the audio or video is altered or replaced by a segment from another video can be detected by verifying the integrity and consistency of the recovered watermark payload from each portion of the signal. For example, a part of the watermark payload in the video portion could be encoded such that it provides a clue to the payload in the audio portion (or vice versa). In the simplest case, the audio and video watermarks could be identical. Verification can also be carried by checking payload consistency and integrity as a function of time. Thus, changes such as compositing of video frames or replacing the audio track or tracks can be identified. The synchronization component of the watermark signal can directly provide information about other transformations to the media. For example, the synchronization process may determine that an image has undergone an affine geometric transformation. Or that the time scale of the audio signal has been modified.

Fingerprinting and recognition techniques are generally designed to disregard or discard transformations to the media signal, particularly those transformations that are perceptually irrelevant to the task of identification. However, once the media signal sample has been identified, further analysis can be carried out to determine the transformations the sample has undergone or to determine the characteristics of the channel through which the sample was distributed. This is analogous to the processing that is carried out in the fields of speech recognition and speaker identification. In speech recognition, characteristics of the individual speaker are ignored to focus on recognizing what was said. In speaker identification, the emphasis is on extracting characteristics of the individual speaker while disregarding what was said. However, determining what was said can be used advantageously to hone in on the speaker characteristics. Below, we describe a few approaches for deriving channel characteristics using fingerprinting and recognition techniques.

In the sections that follow, we discuss different classes of fingerprint techniques: 1. Those that are used to identify a content signal that are: a) channel independent; and b) channel dependent. 2. A signal characteristic extraction that is a characteristic of the channel in which the content signal is distributed (e.g., the compression format, transmission channel, etc.), as opposed to the particular content signal (it is channel dependent, but not content signal dependent). Typically for basic recognition, fingerprint techniques are designed for class 1.a). In this case, recognition itself does not enable the channel to be identified, but it does enable the system to retrieve a reference version of the content signal, which can then be compared to the received signal to determine distortions (including channel distortion from which the channel is determined). In class 1.b), the fingerprint database is segmented into different sets of fingerprints, each set being dependent on a particular channel. This segmentation enables the channel to be identified and/or the system to identify the signal across different channels (e.g., by doing a search for a match across the different sets). Preferably, content recognition is optimized by determining channel characteristics, and then at least prioritizing the database matching process on the segment of the database where content fingerprints dependent on the channel associated with those characteristics are stored. In class 2, the system extracts characteristics associated with the channel (e.g., particular attributes that reflect distortion introduced by a channel that are distinguishable from distortion of different channels). These systems can be integrated to achieve optimized recognition or desired application results (e.g., efficient database search for content recognition, content and channel recognition, channel identification, distortion analysis, etc.). For example, extraction of channel characteristics is used to identify a channel using a class 2 approach (see section 2.2), and then the content signal dependent fingerprints for that channel are searched using a class 1b approach (see section 2.2.1).

2.1 Identification of the Channel (Distortion) after Identifying the Content

In this approach, the media signal sample is identified as usual using recognition or fingerprinting techniques (or even using watermarking). Once the media sample is identified, a comparative analysis can be performed with the reference signal for this media stored in a reference database. This analysis can include comparison of signal bandwidth to determine presence and amount of compression or an estimation of signal quality by comparing the fidelity of the signal sample with that of the reference. For images or video frames, the sample can be compared with the reference to determine geometric transformations (change in rotation, scale, affine transforms, cropping, aspect ratio change, etc.) using image registration techniques (L. G. Brown, A survey of image registration techniques, ACM. Computing Surveys 24 (1992) 326-376.).

If the initial identification shows presence of multiple media signals in the sample signal, then the sample could be compared with the reference signals corresponding to each identity present. Portions of the media sample can be correlated with portions of the reference signals to determine manipulations such as video frame replacement, image region replacement or replacement or dubbing of audio portions.

Detailed analysis of the sample and reference signal can shed light on the possible distribution path taken by the sample signal. For example, consider that a video has been distributed through 3 different channels—a high definition version such as through a Blu-ray Disc, a standard definition version such as through a DVD, and a mobile (lower resolution) version for consumption on a mobile phone. An analysis of the quality and bandwidth of the sample signal and comparison and correlation with the signals from each of the three distribution paths can help determine the most likely distribution path of the sample signal.

2.2 Identification of the Content after Identification of the Channel

In certain cases, the channel can be identified without identification of the media signal sample itself. Consider a compressed audio sample (for example, in MP3 or AAC format). The bit-rate of this sample can be determined from the bitstream itself without having to identify the audio content. One can also infer channel characteristics by analyzing signal degradation—for example a blurry video with small frame size is unlikely to be from a high definition source. Such information can be used to improve the robustness of identification techniques such as fingerprinting or recognition. For example, a fingerprint database could be segmented into a low resolution portion and a high resolution portion. For the audio sample, identification can be confined to the relevant portion of the database. Once the sample is identified, further analysis can be carried out as described in Section 2.1.

2.2.1 Segmentation of the Fingerprint Database

As mentioned above, the fingerprint database lookup can be tailored based on signal characteristics or identification of the channel. The fingerprint database can be segmented or partitioned into distinct regions to focus the content identification task on identification of the channel. As a further improvement, the fingerprint database could contain references to multiple variations of the same content. For example, 64 kbps section of an audio fingerprint database could store relevant characteristics at 64 kbps, while a higher bit-rate section could store relevant characteristics at that bit-rate.

3 Continuum Between Fingerprinting and Watermarking

Fingerprinting (recognition) and watermarking can be considered as two ends of a continuous spectrum of techniques for identifying signals. Between these two ends lie a set of techniques that change from strongly content derived (or content-based identification) identification to weakly content derived identification to content independent identification. We elaborate further on examples of some of these techniques below.

3.1 Fingerprinting

Fingerprinting and recognition techniques derive information (in the form of patterns, features, bits or fingerprints) from the content to characterize the content. Identification is carried out by matching with reference patterns, features, bits or fingerprints stored in a reference database. In these techniques, a match is obtained if the fingerprints of a sample signal match fingerprints in the reference database with a high probability. Perceptually similar copies of media result in matched fingerprints or features. These set of techniques do not have information carrying capabilities (i.e., the signal cannot convey any extraneous information that is independent of the signal itself). Note also that signals which have not previously been analyzed and stored in the reference database cannot be identified. The size of the reference database grows in proportion to the number of media signals that need to be identified.

3.2 Fingerprinting with a Priori Information

In these set of techniques, the fingerprinting or recognition technique can differentiate certain transformations (that are known beforehand) of media. For example, fingerprints extracted from pre-distorted versions of the media can be used for later identifying each distinct pre-distorted version. A priori information includes knowledge about the type of possible pre-distortions that may be applied. Here, the distortion applied may or may not be perceptually significant. Examples of this approach include those described in Section 2.2.1. The identification process for these techniques could proceed along the lines described in Section 2.1. For example, the initial identification could ignore the pre-distortions, whereas after initial identification, further inspection of the signal could be carried out to determine the distinct pre-distorted version that it matches with.

3.3 Fingerprinting with a Posteriori Information

In fingerprinting with a posteriori information, the identification part is carried out in the same manner as traditional fingerprinting. Once the media sample is identified, a posteriori information is used to infer further characteristics of the media signal sample. These characteristics include information about the channel through which the sample was distributed or transmitted, and degradations and manipulations that the signal may have undergone. A posteriori information includes knowledge obtained by analyzing how media signals behave and degrade through various channels and the knowledge of the effect of degradations and manipulations on attributes of the media signal. This knowledge may not be directly derived from that particular media signal but could be a generalization of observed behavior on a collection of related media signals. The techniques described in Section 2.1 fall under this category.

3.4 Combined Fingerprinting and Watermarking

In this category of techniques both fingerprinting and watermarking are employed to take advantage of the complementary benefits afforded by each technique and to overcome their respective limitations and weaknesses. Some examples of combined fingerprinting and watermarking are described in Section 1. In addition, combined techniques are particularly useful for dealing with legacy media and system costs. For example, legacy media that have not been watermarked are identified using fingerprinting techniques. Also, to reduce system costs during identification, watermark detection is performed first. If watermark detection fails, fingerprints are extracted for searching and matching with the reference database. Signal processing operations that are common to both watermark detection and fingerprint extraction are performed first to avoid duplication.

3.5 Integrated Watermarking and Fingerprinting

In these class of techniques, characteristic information derived from the content (i.e., fingerprint) is stored within the watermark payload. See, U.S. Pat. No. 7,519,819. Content derived information is thus tightly coupled within the watermark. These techniques are primarily used in authentication-type applications.

3.6 Informed Watermarking

In this class of techniques information about the media signal is used in watermarking, although it is not directly encoded into the watermark payload. In informed coding, the codeword comprising the watermark signal (or payload) is influenced by knowledge of the host media signal. In informed embedding, the watermark signal is modified or shaped based on the knowledge of the host media signal. In informed detection (non-blind detection) the watermark detection process is provided with information about the original host media signal (I. J. Cox, M. L. Miller, and J. A. Bloom, "Digital watermarking," Morgan Kaufmann, 2001).

Fingerprinting can be used to aid in informed detection by identifying the media signal content using fingerprint matching. Once identified, the original media signal can be retrieved from a database and made available to the watermark detection process. This original signal can be subtracted from the media signal to remove interference to the watermark signal due to the host signal. Alternatively, fingerprinting techniques can be used just to provide the synchronization information. Such techniques are described in Section 1.4 and Section 1.5.

3.7 Watermarking with Auxiliary Recognition

In this category of techniques, the watermark payload is independent of the host media signal content. However, fingerprinting and recognition techniques are used to extract auxiliary information from the content itself. Such auxiliary information could include attributes of the media signal (e.g., dominant color is blue or dominant texture is sand-like etc.) and even semantic information (person driving a red car). Such information could then be used to facilitate intelligent search and retrieval capabilities (without prior analysis of the content).

3.8 Watermarking

In regular watermarking, the information carried by the watermark signal (the payload) is independent of the host content in which the watermark is embedded. Identification is carried out by detecting the presence of the watermark signal and decoding the encoded message and recovering the payload information bits. No reference database is required for recovering the payload. Usually watermarks are embedded imperceptibly in the host media content. Using watermarking, otherwise identical copies of a media signal can be imparted distinct identities by embedding distinct payloads in them. Media content must be watermarked before it is useful in watermarking system.

3.9 Adaptive Systems

Adaptive approaches would seamlessly switch from one technique to another and adapt based on parameters such as available processing power, battery power, network connectivity, bandwidth, detection costs, search and matching costs, connectivity costs, and determine whether detection should be performed on the client or the server. For example, consider a media signal that is watermarked and also referenced in a fingerprint database. For detection of a sample of this signal on a mobile device, one could either use watermarking or fingerprinting. One could begin with watermark detection if that can be easily carried out locally on the device itself. If the watermark was not found, the system would seek to extract fingerprints from the sample and match with the reference database. If the device capabilities (processing) do not support local fingerprint extraction, but bandwidth and connectivity are not a limitation, then the device could transmit the sample (or some pared down version of it) to a remote server for fingerprint extraction and matching. If battery power is limited, the system would perform most processing steps locally before transmission (assuming transmission requires more power than processing on the local CPU). U.S. Patent Publication 20060031684, incorporated by reference above, describes devices that adapt content recognition based on a variety of factors.

4 Efficient Encoding and Recovery of Time Codes in Watermark Payloads

Time codes can be efficiently encoded in watermark payloads and subsequently decoded during detection by taking advantage of the nature of these codes. Time information can be included within a watermark payload in multiple ways. One method is to treat the time codes as a string—say DD:MM:YYYY for day, month and year or HH:MM:SS for hours, minutes and seconds. Another method is to encode the time information in the form of an integer code, for example a 32 bit or 64 bit code. The integer code counts the number of clock ticks from a pre-determined starting point. An example of this is type of code is in the UNIX operating system, where time is counted as the number of elapsed seconds since Jan. 1, 1970.

This type of time code lends itself to encoding in a watermark payload and can be taken advantage of during detection. Consider that a media signal (e.g. video, audio, or any signal that is temporally changing) is to be embedded with an integer-based time code watermark, with the time code changing every T seconds. Assume for now that T=1. Then the time code integer that comprises the payload changes by 1 bit every second (if the time code update interval is also 1 second). During detection, accumulation of the watermark payload over time intervals larger than 1 sec can improve robustness for the common part of the integer time code for the interval, even though some of the time resolution will be lost. The point to note here is that for payloads that vary slowly over time, selectively accumulating portions of the signal could be a worthwhile strategy. In addition to this improvement, specially designed encoding schemes, error correction and error detection schemes can take further advantage of this type of watermark.

Consider an error correction scheme based on Convolutional codes. Assume that the payload during each 1 second interval is subjected to a $\frac{1}{3}^{rd}$ rate Convolutional code. Then the difference between any two successive sets of coded bits would be the last three bits. The difference between any three successive sets of coded bits would be the last 6 bits and so on. This arrangement can be taken advantage of during detection to improve the robustness of detection. Improved robustness can be achieved by combining (accumulating) the coded bits that are common between adjacent watermark segments. Note that accumulation implies a possible loss in temporal resolution—for example, if two adjacent segments are accumulated and taken through a Convolutional decoder (ignoring the last 3 coded bits), the information about the last second in the time code would be lost. The amount of accumulation to use is then a tradeoff between improvement in robustness and loss of temporal resolution. In the limit in severely weak signal situations, one can accumulate the coded bits over the entire length of the media signal to recover as much of the common part of the time code as possible. Note that even in the case of loss in temporal resolution (accuracy down to the last second), it may be possible to recover this information by interpolating the missing data from segments where the temporal accuracy is high.

A variation of this concept can be designed to improve robustness, yet retain the temporal resolution and accuracy. Consider the integer time code mentioned above with each incremental value of the integer denoting a clock tick corresponding to 1 sec. The least significant bit (LSB) of this integer changes every 1 sec. Usually the bits corresponding to this integer code would be input to the Convolutional code starting from the most significant bit (MSB) first and ending with the LSB. Now consider that the bits corresponding to this integer are subjected to error correction with a Convolutional code in bit-reverse order. That is, the bits are input to the Convolutional code starting from the LSB first and ending with the MSB. With this bit-reversed encoding approach, adjacent error correction coded watermark segments will have the same coded bits towards the end of the coded sequences (particularly for long input bit sequences) and differing coded bits at the beginning of the coded sequences. This would allow the common parts to be combined and the unique parts to be left as they are before decoding. In effect, this combination achieves a weighted repetition scheme in conjunction with the Convolutional codes. In a weighted repetition scheme, certain coded bits receive a higher repetition rate (or weight) than other bits. For a Convolutional code, coded bits at the tail are weighted more heavily to improve robustness. See U.S. Pat. No. 7,412,072 and U.S. Patent Publication 2002/0159614, which are hereby incorporated by reference. The weighted combination with the time codes allows the tail of the Convolutional code bits to be far more reliable than the head. The higher reliability of the tail bits translates directly into greater success in decoding and correcting the earlier bits. This scheme would this achieve higher robustness without sacrificing the accuracy in time (since the earlier bits would be far more likely to be corrected in case of errors).

The implicit weighted repetition code mentioned above that was created by accumulating common coded bits of adjacent segments can be further bolstered by using an explicit weighted repetition code. In this particular case, the explicit weighted repetition code would be designed to give higher repetition weighting to the beginning of the payload bits (i.e. opposite to that what is done in the traditional weighted repetition scheme referenced above). The implicit weighting would then be used to weight the latter part of the payload.

Note that the day, month, year based encoding described earlier can also be modified to take advantage of the approaches mentioned here. For example the ordering can be changed to year, month and day to make it slowly changing over time. If the time is encoded such that the time code exhibits slowly changing characteristics, then all the above improvements could be applied. The approaches described here can be applied to any watermark signal that is slowly varying, e.g., any watermark payload with a sequence of bits or other message symbols that vary at different rates. Components of the payload that are repeated over some interval within the content are selectively accumulated over a time interval that is less than or equal to the repetition interval (the time interval over which that component remains the same).

Figure 1:
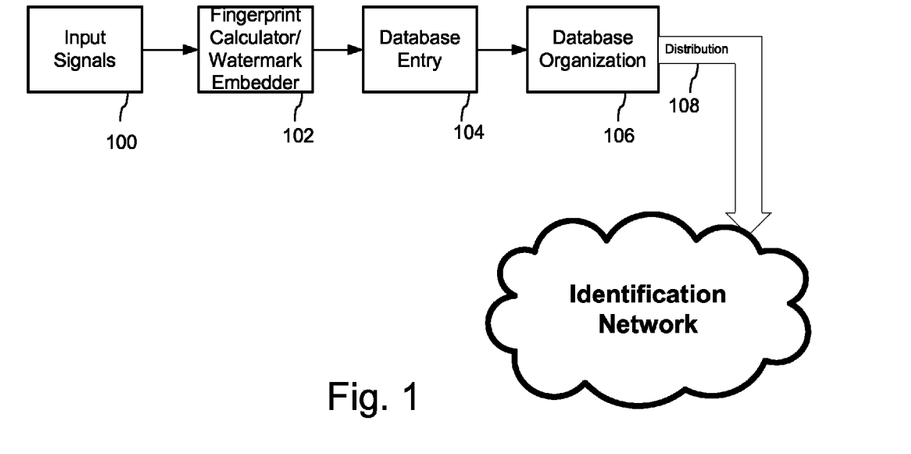
FIG. 1 is a block diagram illustrating the creation of a content recognition system using fingerprints and watermarks.

FIG. 1 is a block diagram illustrating the creation of a content recognition system using fingerprints and watermarks. The digitized input image/video/audio signals 100 are input to the fingerprint calculator/watermark embedder 102, which computes multiple fingerprints for each content item to be uniquely recognized, and also watermarks the content item. In a database entry process 102, the fingerprints are entered and stored in a database, along with additional information, such as metadata for the content item, a digital master copy for use as needed (see above techniques involving use of original content). A database organization process 106 in a database system sorts and arranges the fingerprints in a data structure, such as a tree structure to enable fast searching and matching. This database itself is distributed over an array of computers in an identification network (108). This network receives queries to identify or recognize content items based on a stream of fingerprints and/or watermarks from a requesting device, such as a user's handheld mobile device or other computing device (node in a network of monitoring devices).

Figure 2:
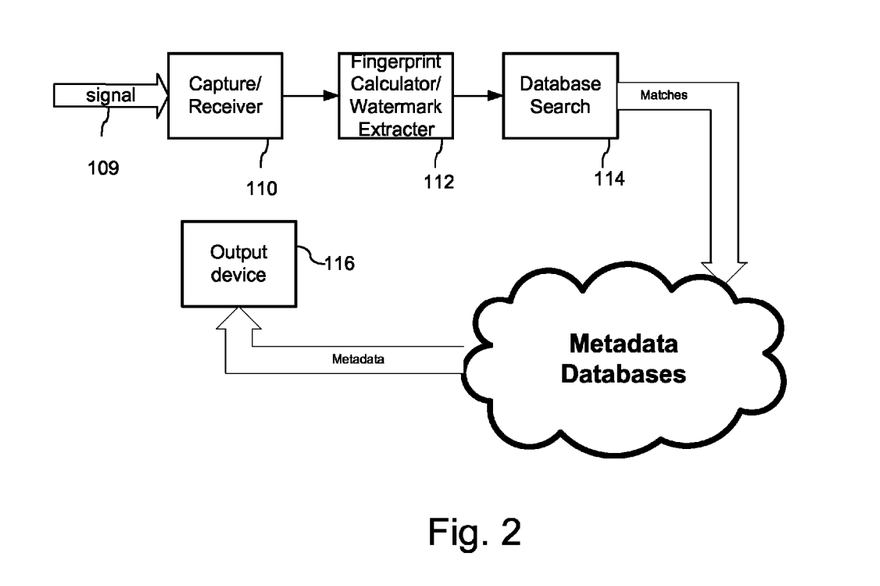
FIG. 2 is a block diagram illustrating the content identification process.

FIG. 2 is a block diagram illustrating the content identification process. Incoming signals 109 are captured in a receiver 110. This includes still or video image capture in which images are captured and digitized with an image sensor like a camera or other image capture device, as well as ambient audio capture by microphone. It also includes receipt of audio, image or video content in a broadcast or transmission channel, including broadcast stream or file transfer. The recognition process may be invoked as part of a systematic Internet monitoring or broadcast monitoring of content signals, in home audience measurement, batch database searching and content indexing, or user requests for content recognition and metadata searching. The fingerprint calculator/watermark extracter 112 computes fingerprints and/or watermarks for incoming content items and issues them to a database for database search for matching fingerprints and data look up for watermark based identifiers 114. The fingerprint matches found in the search process and watermark identifiers provide content identification (a number or some other form of index for metadata lookup), which in turn, enables look up of metadata corresponding to the content identification in one or more metadata databases. The metadata is then returned to device 116 for display/output or further processing. This may involve returning metadata to a device that requested the database search or some other device to which the search results are directed (e.g., a user's home device, or a monitoring system's data collection database in which the metadata and recognition events are aggregated and compiled for electronic report generation).

It is envisioned that the above processes, systems and system components can be implemented in a variety of computing environments and devices. It is specifically contemplated that the processes and components will be implemented within devices and across multiple devices. For example, signal capture, signature calculation and database entry and organization are performed on a set of devices to construct a recognition system, and signal capture, signature calculation and database search and retrieval are performed on another set of devices, which may be distinct or overlap.

The computing environments used to implement the processes and system components encompass a broad range from general purpose, programmable computing devices to specialized circuitry, and devices including a combination of both. The processes and system components may be implemented as instructions for computing devices, including general purpose processor instructions for a variety of programmable processors, including microprocessors, Digital Signal Processors, etc. These instructions may be implemented as software, firmware, etc. These instructions can also be converted to various forms of processor circuitry, including programmable logic devices, application specific circuits, including digital, analog and mixed analog/digital circuitry. Execution of the instructions can be distributed among processors and/or made parallel across processors within a device or across a network of devices. Transformation of content signal data may also be distributed among different processor and memory devices.

The computing devices include, as necessary, one or more processors, one or more memories (including computer readable media), input devices, output devices, and communication among these components (in some cases referred to as a bus). For software/firmware, instructions are read from computer readable media, such as optical, electronic or magnetic storage media via a communication bus, interface circuit or network and executed on one or more processors.

The above processing of content signals includes transforming of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed during processing to compute signatures, including various data structure representations of the signatures as explained above. In turn, the data structure signals in memory are transformed for manipulation during searching, sorting, reading, writing and retrieval. The signals are also transformed for capture, transfer, storage, and output via display or audio transducer (e.g., speakers).

While reference has been made to mobile devices (like cell phones) and embedded systems, it will be recognized that this technology finds utility with all manner of devices—both portable and fixed. PDAs, organizers, portable music players, desktop computers, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" should be construed to encompass all such devices, even those that are not strictly-speaking cellular, nor telephones.

(Details of the iPhone, including its touch interface, are provided in published patent application 20080174570.)

Figure 3:
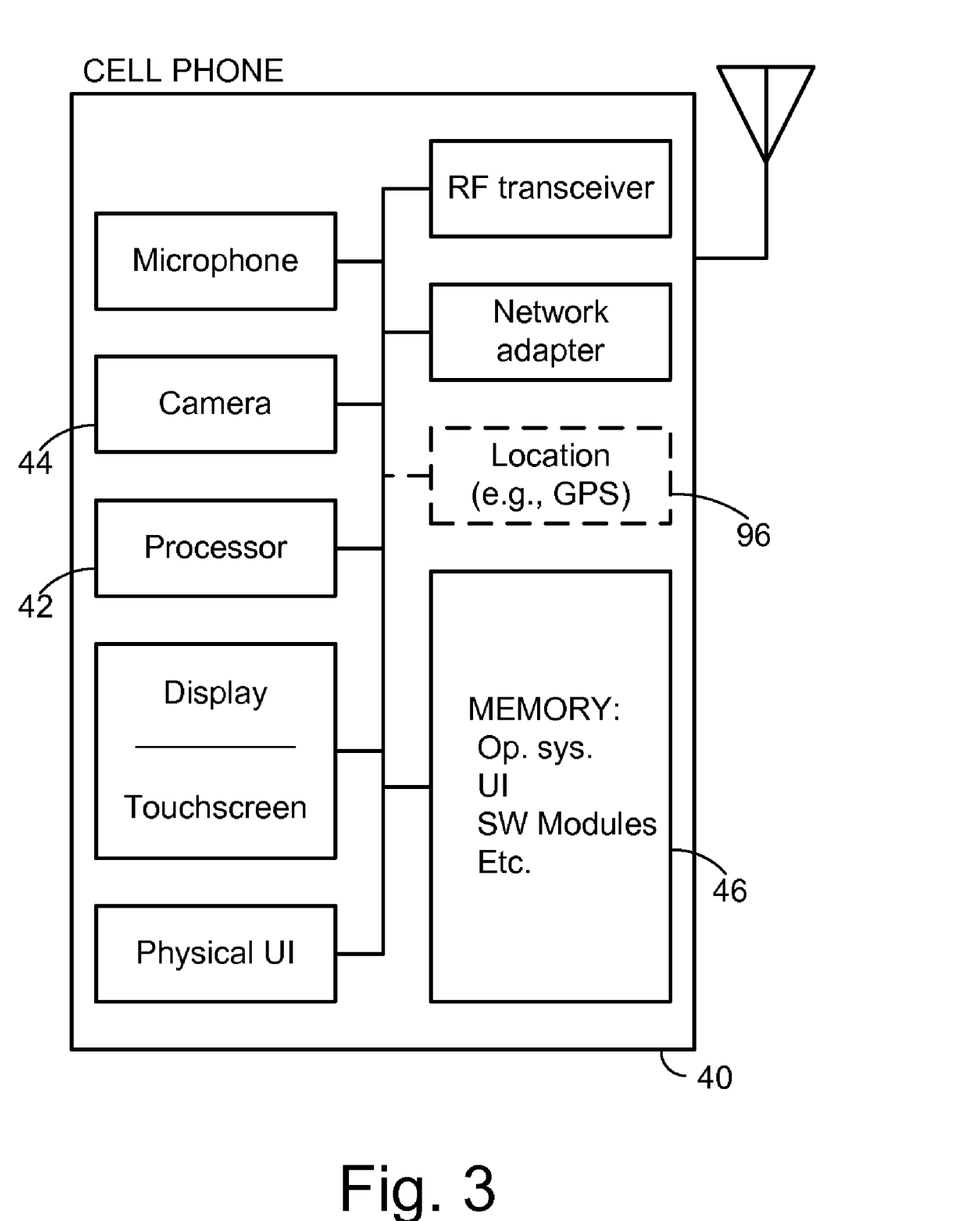
FIG. 3 is a diagram of a cell phone, which may be used in some content recognition systems.

The design of cell phones and other computers that can be employed to practice the methods of the present disclosure are familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), a battery, and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc). An exemplary cell phone that can be used to practice part or all of the detailed arrangements is shown in FIG. 3.

The processor can be a special purpose hardware device, or may be implemented by a programmable device executing software instructions read from a memory or storage, or by combinations thereof. (The ARM series of CPUs, using a 32-bit RISC architecture developed by Arm, Limited, is used in many cell phones.) References to "processor" should thus be understood to refer to functionality, rather than any particular form of implementation.

In addition to implementation by dedicated hardware, or software-controlled programmable hardware, the processor can also comprise a field programmable gate array, such as the Xilinx Virtex series device. Alternatively the processor may include one or more digital signal processing cores, such as Texas Instruments TMS320 series devices.

Software instructions for implementing the detailed functionality can be readily authored by artisans, from the descriptions provided herein. ences, conclusions, and other determinations noted above.

Typically, devices for practicing the detailed methods include operating system software that provides interfaces to hardware devices and general purpose functions, and also include application software that can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. For example, extraction of signatures from a test image on a cell phone, and searching of a database for corresponding reference images on a remote server, is one architecture, but there are many others. For example, information about reference images may be stored on the cell phone—allowing the cell phone to capture a test image, generate signatures, and compare against stored signature data structures for reference images—all without reliance on externals devices. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, functions or operations, to servers dedicated to such tasks.)

In like fashion, data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in an operation.)

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The particular combinations of elements and features in the above-detailed embodiments are exemplary only; the interchanging and substitution of these teachings with other teachings in this and the incorporated-by-reference patents/applications are also contemplated.

I claim:

1. A content recognition method comprising:
using a programmed processor to perform the acts of:
computing a fingerprint for a received portion of a content signal;
sending the fingerprint to a reference database to identify the content signal, the reference database providing identity by matching the fingerprint with reference fingerprints in the database;
based on the identity, obtaining a reference copy of the content signal; and
determining distortion of the received portion of the content signal based on a comparative analysis between the received portion and the reference copy.

2. The content recognition method of claim 1 wherein the reference copy and the received portion are used to determine the geometric transformation of the received portion relative to the reference copy.

3. The content recognition method of claim 2 including applying the geometric transformation to synchronize the received portion for extraction of a digital watermark from the received portion.

4. The content recognition method of claim 3 including:
extracting the digital watermark from the received portion.

5. The content recognition method of claim 1 wherein the distortion is used to determine a distribution channel of the received portion.

6. A method of content recognition comprising:
using a programmed processor to perform the acts of:
analyzing a received portion of a content signal to infer signal degradation of the content signal;
determining a distribution channel from the signal degradation;
computing a fingerprint for the received portion of the content signal;
sending the fingerprint to a reference database to identify the content signal, the reference database providing identity by matching the fingerprint with a set of reference fingerprints in the database corresponding to the distribution channel, the database being segmented into different sets of reference fingerprints corresponding to distribution channels such that the different sets include reference fingerprints for a common set of content signals, but store different reference fingerprints for the common set of content signals that are computed based on signal characteristics relevant for the different distribution channels; and
using the distribution channel to determine which of the different sets to use to identify the content signal.

7. The method of claim 6 wherein the distribution channel corresponds to compression format.

8. The method of claim 6 wherein the analyzing comprises analyzing characteristics of the content signal to infer a transmission channel.

9. A content recognition method comprising:
using a programmed processor to perform the acts of:
receiving different versions of a content signal, the different versions corresponding to different distribution channels;
computing reference fingerprints for the different versions, and storing the reference fingerprints in a corresponding section of a segmented database, the corresponding section being associated with a particular distribution channel; and
in response to a request, determining a match for a received fingerprint by searching for a match in a section of the database corresponding to distribution channel associated with the received fingerprint.

10. The method of claim 9 including: extracting a characteristic of a transmission channel through which a content signal is transmitted, and using the characteristic to determine the transmission channel.

11. The method of claim 10 wherein determining a match comprises searching for a match in a section of the database that is dependent on the transmission channel.

12. The method of claim 10 wherein extracting the characteristic comprises performing a distortion analysis, and further including determining the match in a section of the database depending on the distortion analysis.

13. A content recognition system comprising:
one or more programmed computers configured to:
obtain a fingerprint for a received portion of a content signal;
search for the fingerprint in a reference database to identify the content signal, the reference database providing identity by matching the fingerprint with reference fingerprints in the database;
obtain, based on the identity, a reference copy of the content signal; and
determine distortion of the received portion of the content signal based on a comparative analysis between the received portion and the reference copy.

14. The content recognition system of claim 13 wherein the reference copy and the received portion are used to determine the geometric transformation of the received portion relative to the reference copy.

15. The content recognition system of claim 14 including a programmed computer configured to apply the geometric transformation to synchronize the received portion for extraction of a digital watermark from the received portion.

16. The content recognition system of claim 15 including:
a programmed computer configured to extract the digital watermark from the received portion.

17. The content recognition system of claim 13 wherein the distortion is used to determine a distribution channel of the received portion.

18. A system for content recognition comprising:
one or more programmed computers configured to:
analyze a received portion of a content signal to infer signal degradation of the content signal;
determine a distribution channel from the signal degradation;
compute a fingerprint for the received portion of the content signal;
send the fingerprint to a reference database to identify the content signal, the reference database configured to provide identity by matching the fingerprint with a set of reference fingerprints in the database corresponding to the distribution channel, the database being segmented into different sets of reference fingerprints corresponding to distribution channels such that the different sets include reference fingerprints for a common set of content signals, but configured to store different reference fingerprints for the common set of content signals that are computed based on signal characteristics relevant for the different distribution channels; and
use the distribution channel to determine which of the different sets to use to identify the content signal.

19. The system of claim 18 wherein the distribution channel corresponds to compression format.

20. The system of claim 18 including a programmed computer configured to analyze characteristics of the content signal to infer a transmission channel, wherein the system is configured to identify the content signal depending on the transmission channel.

21. A content recognition system comprising:
one or more programmed computers configured to:
receive different versions of a content signal, the different versions corresponding to different distribution channels;
compute reference fingerprints for the different versions, and store the reference fingerprints in a corresponding section of a segmented database, the corresponding section being associated with a particular distribution channel; and
determine, in response to a request, a match for a received fingerprint by searching for a match in a section of the database corresponding to distribution channel associated with the received fingerprint.

22. The system of claim 21 including: one or more programmed computers configured to extract a characteristic of a transmission channel through which a content signal is transmitted, and configured to use the characteristic to determine the transmission channel.

23. The system of claim 22 including a programmed computer configured to determine a match by searching for a match in a section of the database that is dependent on the transmission channel.

24. The system of claim 22 including one or more programmed computers configured to perform a distortion analysis, and configured to determine a match in a section of the database depending on the distortion analysis.

* * * * *